(No Model.)
J. T. REID.
VEHICLE FOR COTTON PICKERS.
No. 273,157. Patented Feb. 27, 1883.
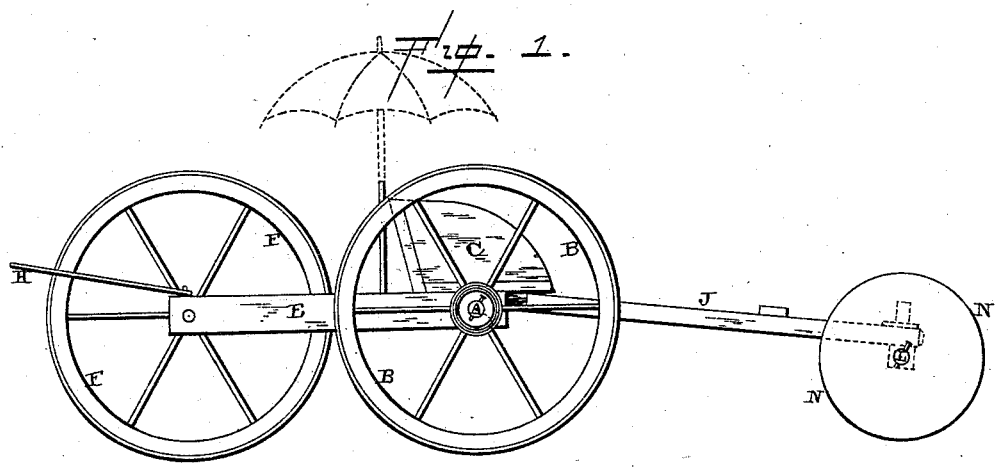
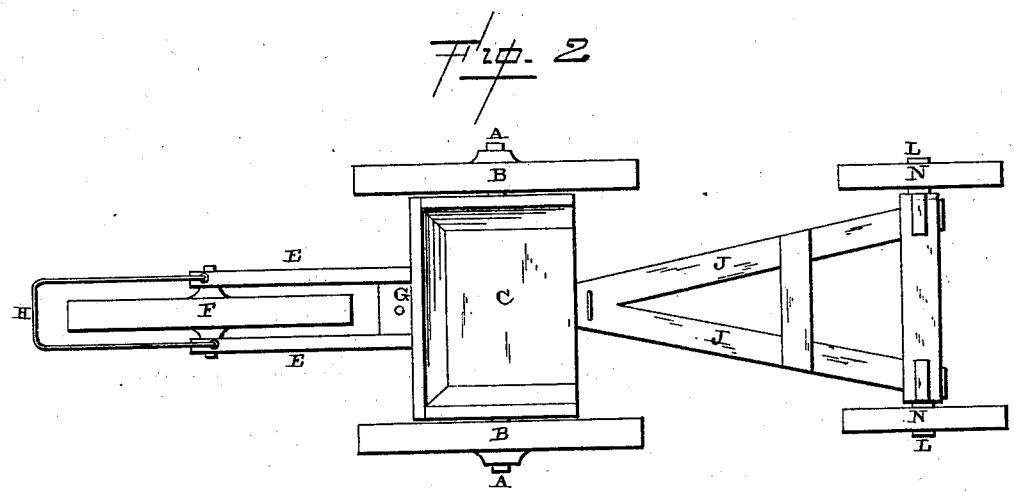
Witnesses.
Louis F. Gardner
E. D. York
Inventor.
J. T. Reid,
per
F. A. Lehmann,
Atty

UNITED STATES PATENT OFFICE.

JOHN T. REID, OF PAIGE, TEXAS.

VEHICLE FOR COTTON-PICKERS.

SPECIFICATION forming part of Letters Patent No. 273,157, dated Febauary 27, 1883.

Application filed November 27, 1882. (No model.)

*To all whom it may concern:*

Be it known that I, JOHN T. REID, of Paige, in the county of Bastrop and State of Texas, have invented certain new and useful Improvements in Vehicles to be Used in Picking Cotton; and I do hereby declare the following to be a full, clear, and exact description of the invention, such as will enable others skilled in the art to which it pertains to make and use it, reference being had to the accompanying drawings, which form part of this specification.

My invention relates to an improvement in vehicles to be used in picking cotton; and it consists in a three-wheeled vehicle provided with a seat, in combination with a suitable frame which is supported at one end upon two wheels, and which is loosely attached at its other end to the axle of the three-wheeled vehicle, and which is used for carrying the bag or basket which is to hold the cotton, as will be more fully described hereinafter.

The object of my invention is to provide a suitable vehicle by means of which the cotton-picker can propel himself along backward between the rows of cotton-plants and carry the picked cotton along with him, and thus enable persons to pick cotton who have weak backs, or who are afflicted with rheumatism so that they cannot bend to pick cotton, and to carry that which has been picked along with them without tiring themselves to carry it.

Figure 1 is a side elevation of my invention complete. Fig. 2 is a plan view of the same.

A represents a suitable axle, which is supported at each end upon the two driving-wheels B. Upon the top of this axle is secured the seat C for the cotton-picker to sit on. Extending rearwardly from this seat are the two supports or braces E, between the rear ends of which is pivoted a third wheel, F. The front ends of these braces are secured to the sides of a short extension, G, which projects horizontally from the axle, and which serves both as a means of attachment for the braces and as a support for the shade or umbrella which is to protect the cotton-picker from the sun. These braces are secured rigidly in position, and have attached to them, at their rear ends, a suitable rigid handle, H, by means of which the vehicle can be drawn along from place to place, ready to be used.

Loosely attached to the front side of the axle A is the triangular frame J, which has its front end rigidly secured to the axle L, which is supported upon the two wheels N. This triangular frame will be provided with suitable means for holding a basket or bag into which the picked cotton is thrown by the operator. This frame is to be drawn along after the three-wheeled vehicle, but directly in front of the operator as he sits upon the seat C. This vehicle having been drawn, by the means of the rigid handle, to the end of the row of cotton, the operator sits down upon the seat C, with his feet resting upon the ground and his bag or basket in front of him upon the triangular frame. The operator then pushes himself backward between the two rows of growing cotton-plants, and picks upon both sides as he moves along. When he wishes to guide his vehicle he bears down with his weight upon one corner of the seat, and then pushes with his foot upon the opposite corner, so as to throw the single wheel around more or less to either side.

The great trouble in picking cotton is that many persons are afflicted with weak backs or rheumatism, so that they cannot stoop over, and others with a dizziness of the head, which prevents them from constantly stooping over the plants, and hence the work of picking cotton is limited to persons who are perfectly well. Many persons who are afflicted with rheumatism, weak backs, or dizziness of the head will make excellent cotton-pickers, provided they have means of moving along between the rows without the necessity of having to constantly bend over the plants.

By means of the vehicle above described a person thoroughly protected from the sun can move along between the plants and pick the cotton from both sides alike without having to rise up, except to gather the cotton from the highest plants, and without having the trouble of walking so frequently back and forth for the purpose of emptying his bag or basket. This vehicle opens up a wide range of usefulness to many persons who are incapacitated for labor in the cotton-fields simply because they cannot stand the constant stooping down and rising up that is necessary while walking along between the rows.

Having thus described my invention, I claim—

The combination of a three-wheeled vehicle provided with a seat for the cotton-picker, with a suitable frame supported at one end upon wheels, and loosely connected at its other end with the vehicle upon which the operator sits, the whole machine being designed to be pushed backward by the operator's feet as he sits upon his seat, substantially as described.

In testimony whereof I affix my signature in presence of two witnesses.

JOHN THOMAS REID.

Witnesses:
SAM A. ALEXANDER,
J. A. OVERSTREET.